United States Patent [19]

Motley et al.

[11] Patent Number: 5,038,366
[45] Date of Patent: * Aug. 6, 1991

[54] FREQUENCY MULTIPLEXED FULL DUPLEX 4800 BPS MODEM

[75] Inventors: David M. Motley, Santa Ana; John F. Stockman, Costa Mesa, both of Calif.

[73] Assignee: Hycom, Inc., Irvine, Calif.

[ * ] Notice: The portion of the term of this patent subsequent to Jun. 26, 2007 has been disclaimed.

[21] Appl. No.: 472,367

[22] Filed: Jan. 29, 1990

Related U.S. Application Data

[62] Division of Ser. No. 224,076, Jul. 25, 1988, Pat. No. 4,937,839.

[51] Int. Cl.[5] ............................................. H04L 5/12
[52] U.S. Cl. .......................................... 375/39; 375/8
[58] Field of Search ................... 375/8, 9, 17, 18, 39, 375/59, 60, 58, 65, 122, 117; 370/30, 49, 81, 84; 379/93

[56] References Cited

U.S. PATENT DOCUMENTS

| | | | |
|---|---|---|---|
| 4,417,349 | 11/1983 | Hills et al. | 375/60 |
| 4,731,800 | 3/1988 | Motley et al. | 375/58 |
| 4,747,096 | 5/1988 | Piasecki et al. | 370/81 |
| 4,747,114 | 5/1988 | Martinez | 375/98 |
| 4,748,640 | 5/1988 | Staley et al. | 375/65 |

*Primary Examiner*—Stephen Chin
*Attorney, Agent, or Firm*—Gordon L. Peterson; Harry G. Weissenberger

[57] ABSTRACT

4800 B/S full duplex operation of a frequency-multiplexing modem over the switched telephone network without cancellation is made possible by combining 900-baud, 32-state operation with a combination of analog filtering and raised cosine digital filtering and stop bit robbing.

5 Claims, 4 Drawing Sheets

FREQUENCY MULTIPLEXED FULL DUPLEX 4800 BPS MODEM

This application is a division of application Ser. No. 224,076, filed 07/25/88 U.S. Pat. No. 4,937,839

FIELD OF THE INVENTION

This invention relates to modems operating over the switched telephone network using frequency multiplexing, and more particularly to a combination of techniques which allow a modem to operate in full duplex at 4800 B/S without the need for cancellation.

BACKGROUND OF THE INVENTION

Present technology allows, with frequency multiplexing, 2400 B/S full duplex operation over the switched telephone network. This is accomplished by using 600 baud data transmission on 1200 Hz and 2400 Hz carriers with 16-state modulation, and modems using this technology are typically referred to as V.22 bis modems. The best sample frequency for a digital signal processor implementing this type of modem is 7200 Hz, which is the lowest sample frequency divisible by 2400, with a Nyquist bandwidth greater than 3000 Hz.

With the ever increasing demand for faster data communications, it is desirable to increase the data throughput of modems without using the costly echo cancellation techniques which are conventionally employed in modems of this type to cancel out near and far end echoes of the transmitted signal generated by imperfect hybrids.

SUMMARY OF THE INVENTION

In accordance with the invention, the 2400 B/S data throughput possible with the conventional V.22 bis modem can be doubled, without the need for cancellation, by synergistically combining several individually known techniques.

More specifically, the modem of this invention combines the use of 900 baud modulation, the combined use of analog and raised cosine digital filtering to achieve signal separation, and the use of stop bit robbing. When combined, these techniques cooperate with each other to allow a full duplex data throughput over the switched telephone network of 4800 B/S asynchronous data transmission without resorting to cancellation.

It is therefore the object of the invention to use a novel, synergistic combination of known modem techniques to greatly increase the data throughput of a modem at little or no additional cost.

Figure 4:
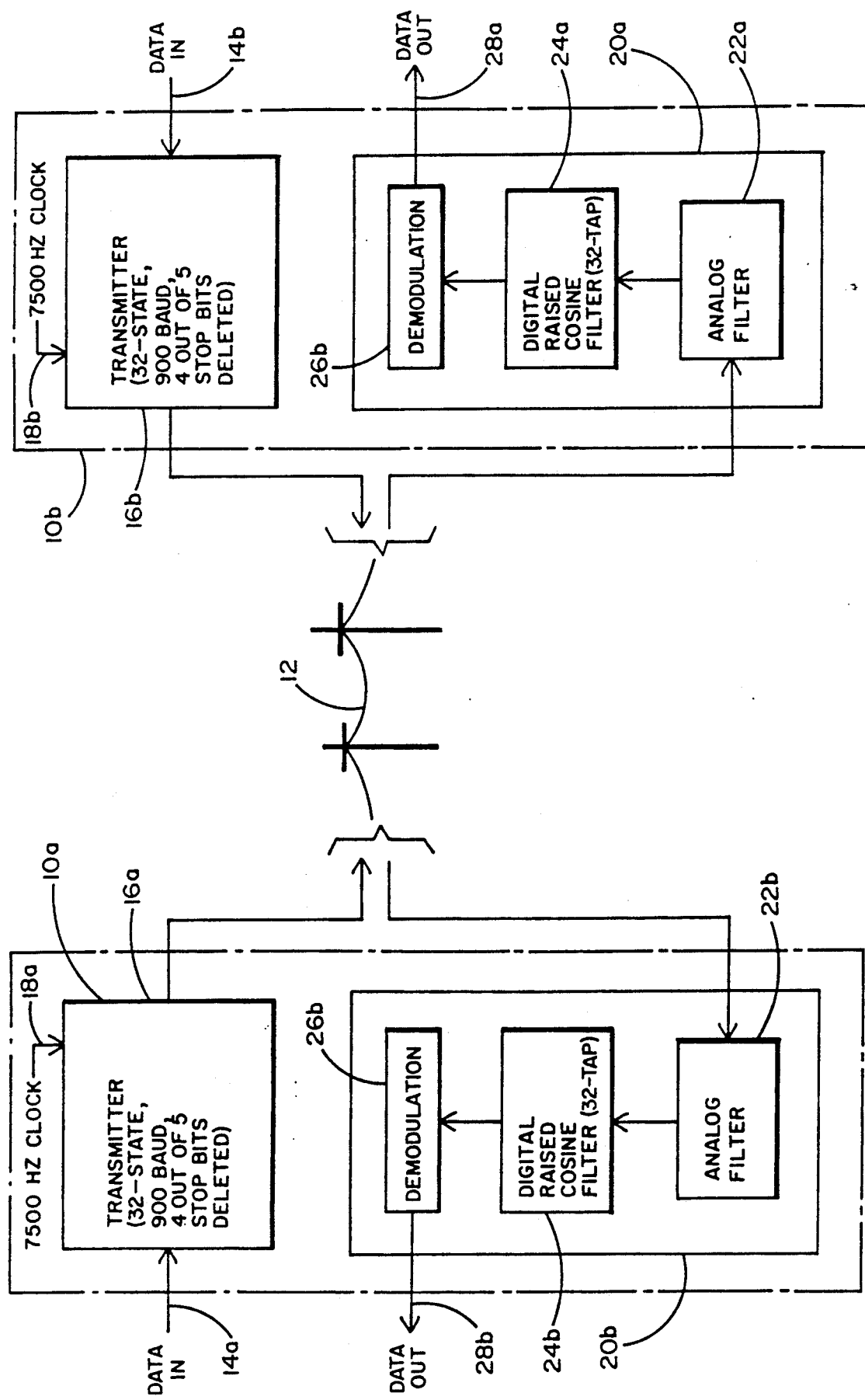
FIG. 4 shows the environment in which the invention is practiced. In that FIG., 10a and 10b are a pair of V.22 bis modems communicating over a telephone line 12. In one direction, 4800 B/S data is applied to the data input 14a of a conventional transmitter 16a driven by a 7200 Hz clock 18a. The transmitter 16a is arranged to remove four out of every five stop bits from the data appearing at input 14a, and then encode it into a phase and amplitude modulated symbol train using a 32-state symbol constellation. The resulting symbol train is then transmitted at 900 baud over the telephone line 12.

The symbol train 12 is received by a receiver 20a in which it is filtered first through a conventional analog filter 22a and then through a digital raised cosine filter 24 before being applied to the conventional demodulator/detector 26a. The output of demodulator/detector 26a is the 4800 B/S data output 28a. The corresponding elements of FIG. 4 with the suffixes b function in the same manner for the other direction of data transfer.

DESCRIPTION OF THE PREFERRED EMBODIMENT

Figure 1A:
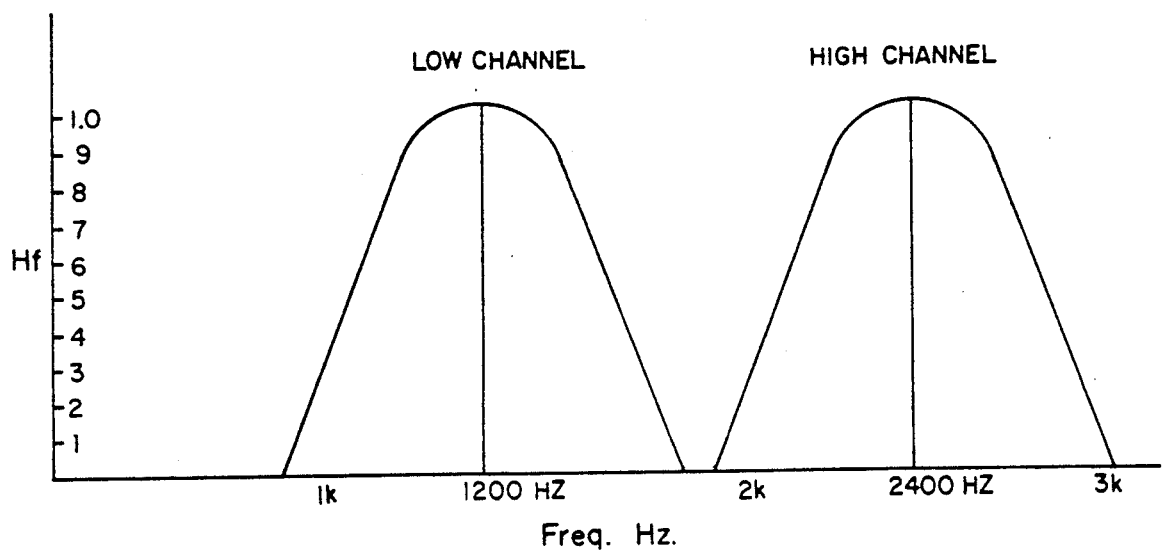
FIGS. 1a and 1b show the transmit spectra for the prior art V.22 bis technology and for the inventive 4800 B/S technology.
Figure 1B:
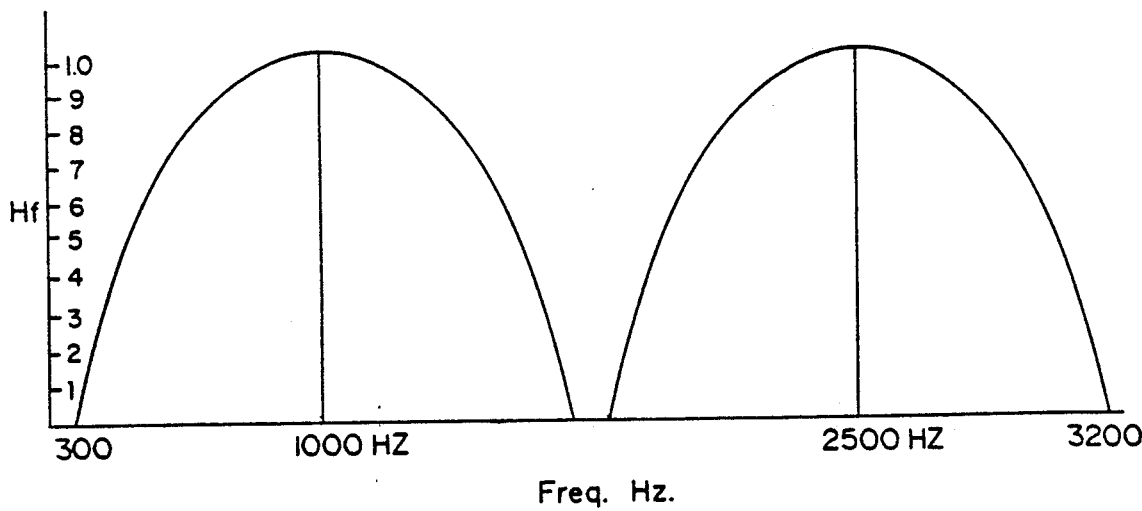

FIGS. 1a and 1b compare the transmission spectra of the V.22 bis modem and of the 4800 B/S modem of this invention. It will be noted that for the inventive modem, the center frequencies of the low and high bands have been changed, respectively, from 1200 Hz to 1000 Hz, and from 2400 Hz to 2500 Hz. Also, the bandwidth at 40 dB down has been increased from +525 Hz to +750 Hz.

Figure 2:
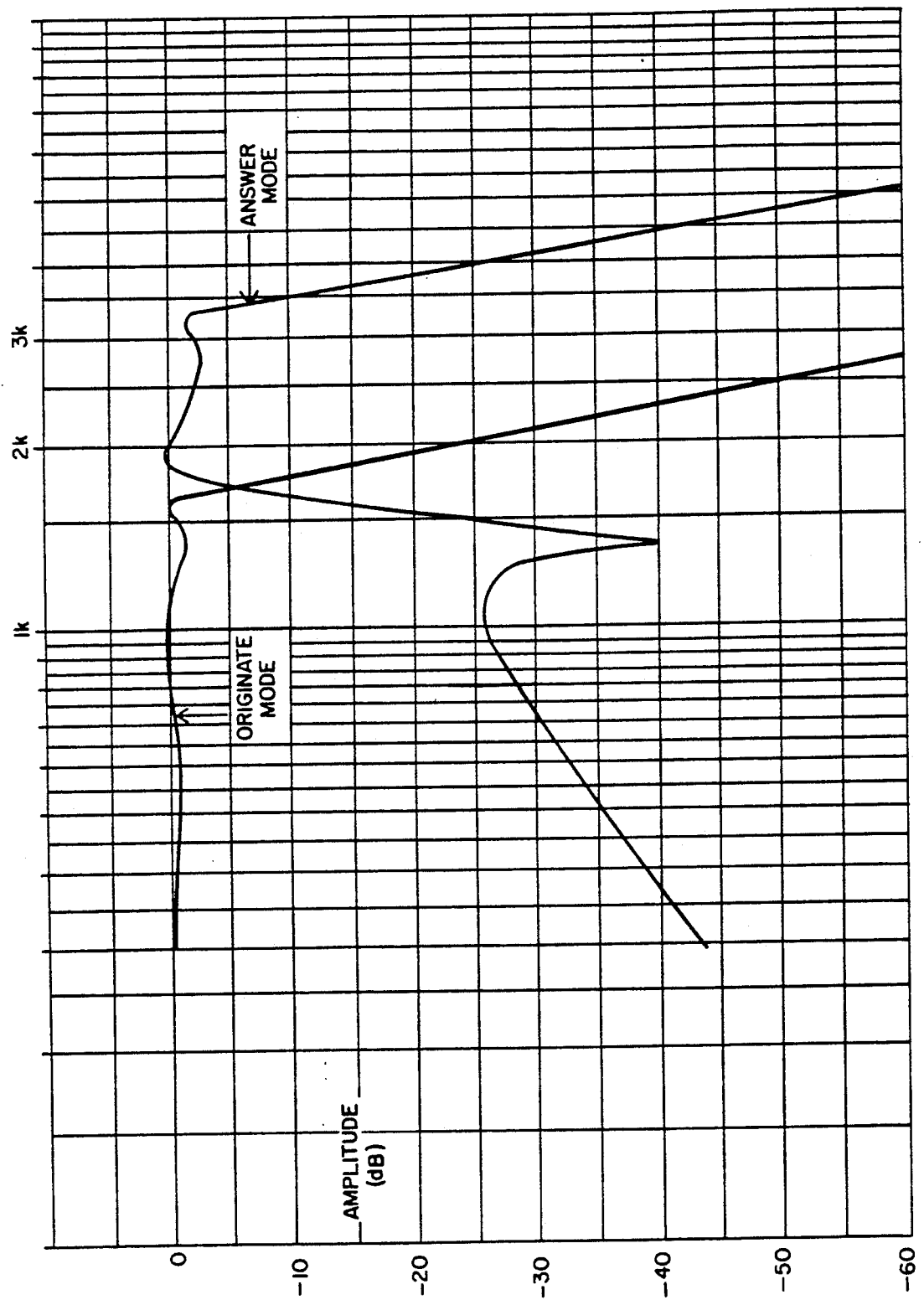
FIG. 2 is an amplitude-frequency diagram illustrating the spectral characteristics of a set of typical analog front end filters for a frequency-multiplexing full duplex modem.

Shown in FIG. 2 are the spectral characteristics of a set of typical analog front end filters for a frequency multiplexing full duplex modem. These filters attempt to separate the low and high channels and represent what can be normally achieved with conventional LSI-switched capacitor filtering. It should be noted that if the receive level of one channel is −47 dBM and the transmit level of the other channel is −10 dBM (reduced to −17 dBM by the hybrid), the resulting cross-channel interference is 30 dB above the received signal level. This must be reduced to 30 dB below the received signal level for proper operation of the modem, requiring at least 60 dB cross-channel attenuation.

If the cross-channel attentuation of the analog filters as shown in FIG. 2 were plotted, they would appear as shown in Table I.

TABLE I

| Frequency (Hz) | Attenuation (dB) |
|---|---|
| 1000 | 26 |
| 1100 | 26 |
| 1200 | 26 |
| 1300 | 30 |
| 1400 | 40 |
| 1500 | 27 |
| 1600 | 15 |
| 1700 | 10 |
| 1800 | 10 |
| 1900 | 17 |
| 2000 | 22 |
| 2100 | 27 |
| 2200 | 33 |
| 2300 | 38 |
| 2400 | 42 |
| 2500 | 47 |

Cross-channel attenuation is defined as the resultant overall effect of one channel on the other. In practice, it is the sum of all pertinent filter attenuation characteristics.

The digital filtering, when combined with the analog filtering, must then produce the required 60 dB or more of cross channel attenuation.

A technique which makes it possible to achieve that result is the raised cosine digital filtering method described in U.S. Pat. No. 4,731,800. This method maximizes the out-of-band attenuation while using a minimum of taps. In the preferred embodiment of this invention, a 32-tap 16.7% oversampled raised cosine filter of 1050 baud is utilized. The oversampling is explained in detail in U.S. Pat. No. 4,731,800.

The typical cross-band attenuation which can be obtained with such a filter in a modem using a 1000 Hz carrier for the low channel and a 2500 Hz carrier for the high channel is shown in Table II. It should be noted that this is the maximum carrier separation possible for operations over poor lines.

TABLE II

| Frequency (Hz) | Attenuation (dB) |
| --- | --- |
| 1000 | 43.6 |
| 1100 | 64.4 |
| 1200 | 42.1 |
| 1300 | 47.6 |
| 1400 | 43.1 |
| 1500 | 46.4 |
| 1600 | 50.7 |
| 1700 | 61.3 |
| 1800 | 61.3 |
| 1900 | 50.7 |
| 2000 | 46.4 |
| 2100 | 43.1 |
| 2200 | 47.6 |
| 2300 | 42.1 |
| 2400 | 64.4 |
| 2500 | 43.6 |

The resultant total attenuation of the combined analog and digital filtering techniques used in the preferred embodiment is shown in Table III to amply meet the required general overall cross-channel attenuation of 60 dB.

TABLE III

| Frequency (Hz) | Attenuation (dB) |
| --- | --- |
| 1000 | 69.6 |
| 1100 | 90.4 |
| 1200 | 68.1 |
| 1300 | 77.6 |
| 1400 | 83.1 |
| 1500 | 73.4 |
| 1600 | 65.7 |
| 1700 | 71.3 |
| 1800 | 71.3 |
| 1900 | 67.7 |
| 2000 | 68.4 |
| 2100 | 70.1 |
| 2200 | 80.6 |
| 2300 | 80.1 |
| 2400 | 106.4 |
| 2500 | 90.6 |

This level of filtering allows full duplex operation at 900 baud. 900 baud is chosen because it is the easily obtainable result of an integer division of the 7200 Hz sample frequency.

With a 7200 Hz clock, the only possible baud rates are those which are the result of an integer division of 7200 Hz. These include the following:

| Divider | Baud Rate (possible) |
| --- | --- |
| 12 | 600 |
| 10 | 720 |
| 9 | 800 |
| 8 | 900 |
| 7 | 1028.6 |
| 6 | 1200 |
| 5 | 1440 |

Because a channel bandwidth of 750 Hz is the maximum that can be provided with 2500 Hz and 1000 Hz carriers, it is mandatory that a baud rate less than 1500 be used. (According to the Nyquist sampling theorem, the maximum baud rate cannot exceed 2 times the available channel bandwidth.) As the baud rates increase, the task of digital filtering and equalization becomes increasingly more difficult. It is thought that a 900 baud rate would result in the maximum gain for a reasonable increase in digital processing requirements.

Figure 3:
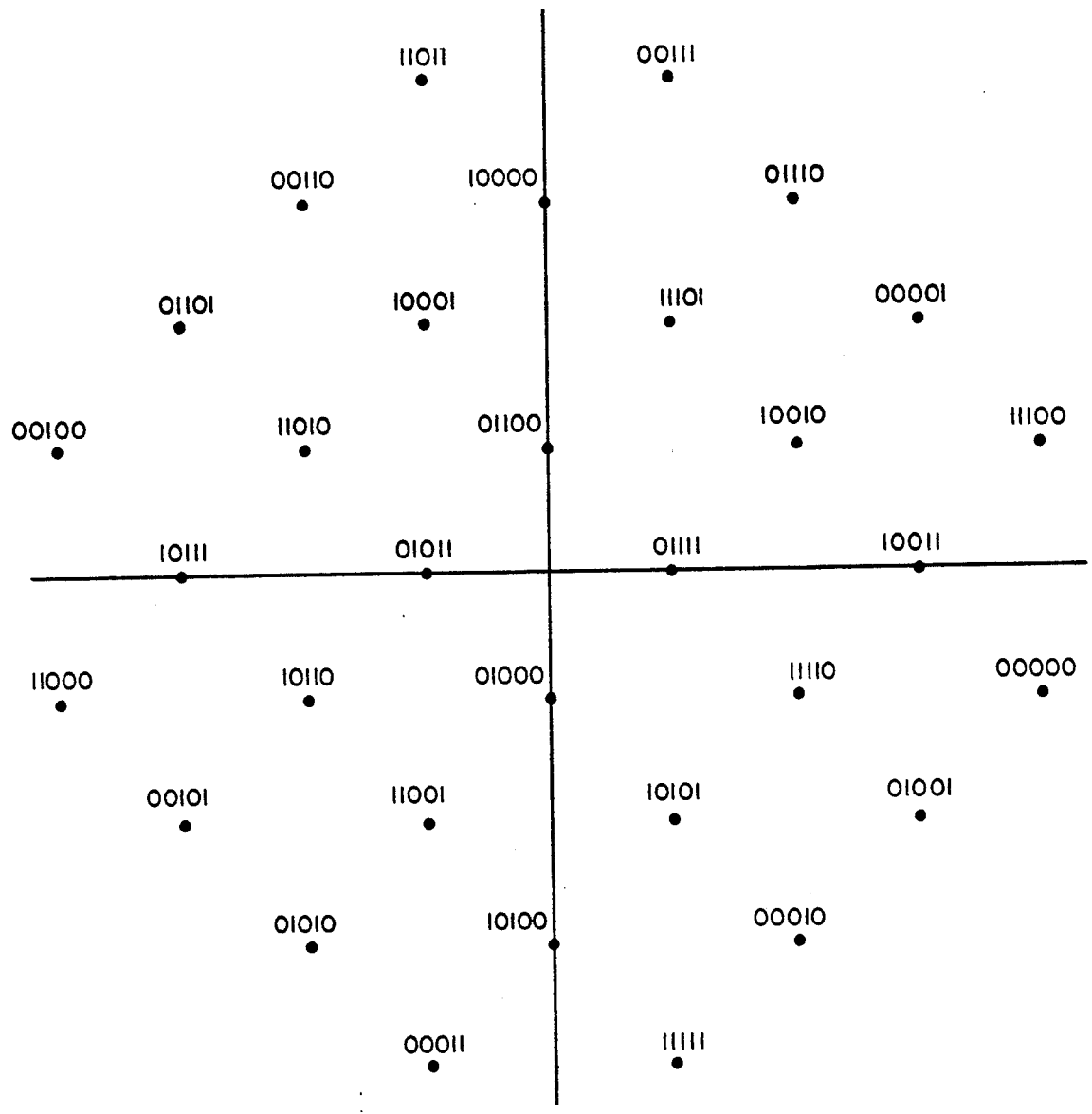
FIG. 3 illustrates a 32-state constellation.

Operation at 900 baud with a 32-state constellation (which has five bits per symbol, see FIG. 3) produces a data rate of $5 \times 900$ or 4500 B/S.

To achieve 4800 B/S operation, it is then necessary to perform appropriate stop bit robbing. Stop bit robbing for 11 bit characters requires the deletion of four out of every five stop bits. This will result in a nominal throughput speed increase as a function of the number of bits per character as shown in Table IV.

TABLE IV

| Bits/Char. | Ratio | Max. Rate | % Over 4800 B/S |
| --- | --- | --- | --- |
| 8 | 40/36 | 5000 | 4.2 |
| 9 | 45/41 | 4939 | 2.9 |
| 10 | 50/46 | 4891 | 1.9 |
| 11 | 55/51 | 4852 | 1.1 |

All of the maximum rate values in Table IV are more than 1% above 4800 B/S, so as to accommodate at least a +1% data input speed variation for 8, 9, 10 or 11 bit asynchronous input data..

Thus, with the aid of the raised cosine filtering method, which makes the use of 900 baud modulation possible; the use of the V.32 32-state constellation; and 4 out of 5 stop bit robbing, it is possible to double the asynchronous data throughput over present technology without having to resort to cancellation techniques. This represents a significant improvement in data speed with essentially no increase in cost.

We claim:

1. A frequency-multiplexed communication system for providing data communication between a pair of V.22 bis modems over the switched telephone network at a full duplex 4800 B/S data rate without echo cancelation, comprising:
   a) a pair of modems having a substantially 7200 Hz sample rate;
   b) means in said modems for transmitting communication signals at substantially 900 baud in a 32-state constellation;
   c) said modems each including:
      i) analog filter means in the receiver section of said modems for pre-filtering received communication signals;
      ii) digital raised cosing filter means for further filtering the pre-filtered received signals; and
      iii) stop bit robbing means in the transmitter section of said modems for robbing, prior to transmitting said signals, sufficient stop bits from the data train to be transmitted by said signals to increase the data throughput rate of said communication system beyond 4800 B/S.

2. The system of claim 1, in which said raised cosine filter is substantially a 32-tap filter and is oversampled by substantially 16.7% at substantially 1050 baud.

3. The system of claim 1, in which the lower channel frequency of the communication signal transmitted over said switched telephone network is substantially 1000

Hz, and the higher channel frequency is substantially 2500 Hz.

4. The system of claim 1, in which the combined filtering action of said analog filter and said digital filter is in excess of substantially 60 db at all communication signal frequencies.

5. The system of claim 1, in which said stop bit robbing means rob at least 4 out of 5 stop bits.

* * * * *